United States Patent
Cavero, Jr. et al.

(10) Patent No.: US 8,123,824 B2
(45) Date of Patent: Feb. 28, 2012

(54) ARTIFICIAL FIRELOG USING OIL AND/OR FAT-RETAINING MATERIALS

(75) Inventors: Alexander U. Cavero, Jr., Stockton, CA (US); Gary W. Leach, Escalon, CA (US); Willer de Oliveira, Stockton, CA (US); Alan Zachary, Oakdale, CA (US)

(73) Assignee: Duraflame, Inc., Stockton, CA (US)

( * ) Notice: Subject to any disclaimer, the term of this patent is extended or adjusted under 35 U.S.C. 154(b) by 765 days.

(21) Appl. No.: 12/004,252

(22) Filed: Dec. 18, 2007

(65) Prior Publication Data

US 2008/0196302 A1    Aug. 21, 2008

Related U.S. Application Data

(60) Provisional application No. 60/875,983, filed on Dec. 19, 2006.

(51) Int. Cl.
*C10L 11/00*    (2006.01)
(52) U.S. Cl. ............... 44/535; 44/550; 44/589; 44/590
(58) Field of Classification Search ............... 44/535, 44/550, 589, 590
See application file for complete search history.

(56) References Cited

U.S. PATENT DOCUMENTS

| | | | |
|---|---|---|---|
| 3,297,419 A | 1/1967 | Eyre, Jr. ............... | 44/6 |
| 3,843,336 A | 10/1974 | Messman ............... | 44/25 |
| 4,040,796 A | 8/1977 | Vincent et al. ............... | 44/14 |
| 4,326,854 A | 4/1982 | Tanner ............... | 44/10 B |
| 4,333,738 A | 6/1982 | Schrader ............... | 44/15 B |
| 5,868,804 A * | 2/1999 | Williams et al. ............... | 44/535 |
| 6,017,373 A * | 1/2000 | Frisch ............... | 44/535 |
| 6,113,662 A * | 9/2000 | Sprules ............... | 44/535 |
| 6,136,054 A | 10/2000 | Tutupalli et al. ............... | 44/535 |
| 2002/0014036 A1 * | 2/2002 | Chandaria ............... | 44/535 |

(Continued)

FOREIGN PATENT DOCUMENTS

CA    1113246    12/1981
(Continued)

OTHER PUBLICATIONS

Liu et al., "Technical Note on the Combustion Mechanism and Development of the Distillers' Grain-Fired Boiler", Applied Thermal Engineering, vol. 22, No. 3, Mar. 2002, pp. 349-353.

(Continued)

*Primary Examiner* — Cephia D Toomer
(74) *Attorney, Agent, or Firm* — Koppel, Patrick, Heybl & Philpott; Michael J. Ram

(57) ABSTRACT

An artificial firelog according to the present invention may comprise as constituents a combustible cellulosic or fiber material, a non-absorbent combustible oil- and/or fat-retaining material, and a combustible binder/fuel or wax in appropriate proportions. A combustible binding agent may be also be added as an additional constituent material to allow a further reduction of the combustible wax component.

Certain naturally occurring agricultural by products and synthetic filter materials contain oils and/or fats that provide increased BTU value beyond the cellulosic or mineral components of the material. When these oil- and/or fat-retaining materials added to a blend of firelog material, the non-absorbent properties and additional BTU content of these alternative raw materials allow the amount of higher BTU wax material to be reduced without a dramatic reduction in fuel content in the finished mixture. The non-absorbent oil- and/or fat-retaining materials are significantly less expensive per mass than petroleum wax, and substituting these materials for more costly types of wax reduces cost without degrading the performance of the final firelog product.

17 Claims, 2 Drawing Sheets

U.S. PATENT DOCUMENTS

2005/0016062 A1 * 1/2005 Bonnell-Rickard et al. .... 44/535

FOREIGN PATENT DOCUMENTS

| DE | 19918815 A1 | 10/1999 |
| --- | --- | --- |
| EP | 0962515 A1 | 12/1999 |
| EP | 1245663 A2 | 10/2002 |
| EP | 1471132 A2 | 10/2004 |
| WO | WO9614372 | 5/1996 |
| WO | WO0110984 A1 | 2/2001 |
| WO | WO2004106473 A1 | 12/2004 |

OTHER PUBLICATIONS

PCT Notification of the International Search Report and the Written Opinion of the International Searching Authority, Dated Apr. 16, 2008; for International Application No. PCT/US2007/026062.

* cited by examiner

ARTIFICIAL FIRELOG USING OIL AND/OR FAT-RETAINING MATERIALS

CROSS REFERENCE TO RELATED APPLICATION

This application claims the benefit of U.S. provisional application Ser. No. 60/875,983 filed Dec. 19, 2006.

BACKGROUND OF THE INVENTION

1. Field of the Invention

The present invention relates generally to artificial firelogs and particularly to an artificial firelog effecting cost savings by allowing the amount of relatively expensive petroleum and/or non-petroleum wax components in a firelog to be reduced without an appreciable decrease in heating value or flame intensity.

2. Description of the Related Art

Fireplaces have been used in homes over the years for providing heat as well as to provide a desired ambience. While wood and coal have been the primary fuels for burning in fireplaces, there is an increasing demand for manufactured or artificial fireplace logs (firelogs). These firelogs are easier to purchase and store, provide better heating values (BTU/lb) than wood or coal, are easier to light, safer to use with virtually no maintenance during burning, and can be used to build fires of a known duration, generally from 2 hours to more than 4 hours.

Artificial firelogs are typically manufactured by combining a carrier material, usually particles of cellulosic origin, with a combustible binder/fuel. The cellulosic material may be sawdust, or a mixture of sawdust with other combustible materials of varying proportion. The binder/fuel typically consists of a suitable blend of waxes, either alone or in combination with other combustible materials. Additives imparting desired combustion characteristics, appearance, and other attributes may be combined with the basic ingredients. Such additives may include chemicals designed to color or otherwise modify or retard the flame, add aroma or crackling sounds, or otherwise change the burning characteristics to more closely mimic the burning of natural logs. Following thorough mixing of the ingredients, the resulting mixture is formed into suitable, log-like shapes by extrusion, molding or compression, in either a batch or continuous process.

U.S. Pat. Nos. 3,297,419; 6,017,373; 6,136,054; 5,868,804; 4,333,738; 4,326,854; 3,843,336; and 4,040,796, incorporated herein by reference in their entireties, provide examples of known artificial firelog compositions, configurations and methods of manufacture.

Artificial firelogs are often manufactured from blends of approximately about 50% to about 60% (by weight) of petroleum waxes and about 40 to about 50% (by weight) of cellulosic fibers. The petroleum wax constituent, which may comprise paraffin wax or slack wax by way of example, provides the principal fuel content for the firelog and contains about twice the BTU energy value per unit mass as the cellulosic fibers. The high wax content allows easy ignition of the firelog, long burn time, and aesthetically pleasing flame height and intensity. The main disadvantages of firelogs with high wax content is added cost, an increased burn rate providing an unsatisfactory overall burn time, and/or high flames which can be a safety hazard.

In recent years, there has been dramatic inflation in the cost of petroleum products, including refined products such as petroleum waxes. Between January 2004 and July 2006, for example, petroleum wax costs increased 120%, making it less economic for firelog manufacturers to use petroleum wax in their products. Thus there is a real need to identify viable, practical, and cost-effective alternatives to petroleum waxes which can be used, either in full or in part, in firelog manufacture.

Coffee ground has energy content in excess of about 10000 BTU/lb, which is about 25% higher energy potential (BTU) than a typical wood fiber. U.S. Pat. No. 6,113,662 disclosed that a firelog could be produced with reduced wax content by using spent dried coffee grounds as a fuel source and that, if coffee grounds were used as the principal constituent of the fuel, less combustible binder was required to achieve the equivalent calorific value of a typical sawdust firelog having high wax content. In addition to coffee grounds having a higher calorific value, the grounds apparently also had a higher volatile/fixed carbon ratio than that of wood-based particulates and, for that reason provided superior flame performance. It was concluded from these results that, since dried spent coffee grounds contribute greater calorific value and volatile/fixed carbon ratio than wood sawdust, the coffee firelog required much less wax binder than traditional formulations used for wood sawdust-wax firelogs.

While the burn characteristics of coffee grounds disclosed in U.S. Pat. No. 6,113,662 can make them an appealing material to substitute for wood fibers in firelogs, the higher calorific value and volatile/fixed carbon ratio of the coffee grounds that allowed the wax reduction was probably not the only or most important property that contributes to wax reduction. Coffee grounds also absorb approximately five times less oil or wax than highly absorbent "spongy-like" softwood fibers, and there are many other oil retaining fiber and mineral materials having non-absorbent, increased calorific value and elevated volatile/fixed carbon ratio properties similar to those of coffee grounds.

Similar phenomena related to absorption/adsorption characteristics of cellulosic fibers, for example were noted in U.S. Pat. No. 4,326,854, which disclosed replacing part or all of the sawdust in a firelog with a cellulosic material that absorbed moisture less readily, or was less affected by absorbed water, in order to reduce the swelling and cracking on firelogs. When cellulosic materials such as peanut shell fines, cocoa bean shell fines, coconut shell or walnut shell fines, bagasse or paper pulp were used as a replacement for the wood sawdust in a firelog, either in part or in whole, a firelog less subject to swelling and cracking was typically observed. However, the fuel used in the firelogs was a combustible liquid by-product that had to be chemically solidified, by either polymerization or neutralization by the addition of various chemicals prior to use, processes that would typically increase the cost and complexity of manufacturing a product such as a firelog.

Thus, an object of the present invention is to provide more cost effective raw materials for use in the manufacture of firelogs, materials that allow for the reduction in costly petroleum wax by substituting other, more cost effective materials that make up for the BTU energy content lost from a reduction or elimination of the higher BTU petroleum wax.

SUMMARY OF THE INVENTION

The present invention generally can provide products and compositions that include combustible cellulosic materials having oil-retaining and/or fat-retaining properties. Certain fibers occurring naturally in agricultural by-products, such as non-wood seeds and fibers as well as synthetic filter materials, contain oils and fats that can provide increased BTU value beyond the cellulosic or mineral components of the material, thereby providing a means to decrease the amount of costly petroleum and/or non-petroleum wax used in a firelog. Because of their residual oil and/or fat content, such materials can also absorb less wax material than wood fibers, allowing for an even further reduction in added wax for a firelog mixture. Furthermore, since the cellulosic materials can be obtained and/or derived from renewable, biologically based materials that are readily available, the present invention may also provide enhanced environmental sustainability characteristics for the product.

As a result, the additional BTU content of such alternative, non-absorbing, fibrous raw materials in a firelog blend, along with their non oil-absorbing nature, can allow the amount of higher BTU wax material in typical a firelog mix to be reduced without a dramatic reduction in the calorific value of the finished mixture. Such non-absorbing materials can also be significantly less expensive per mass than a petroleum or non-petroleum wax, such that substituting such materials for wax in a firelog mixture can reduce the cost of manufacturing a firelog without harming the overall performance of the product.

In one aspect, the present invention can provide an artificial firelog having as constituents (a) at least one combustible cellulosic material; (b) at least one combustible non-absorbent material containing oil-retaining and/or fat-retaining material; and (c) at least one combustible wax material, where the relative proportions of the constituents are, by weight, from about 0% to about 40% of (a), from about 10% to about 75% of (b), and from about 25% to about 55% of (c), for about 100 parts of (a), (b) and (c).

In one form of the invention, the combustible non-absorbent material can contain an agricultural by-product, a distillers grain, a filter cake material, or combinations thereof. In another form of the invention, the combustible non-absorbent material may contain an agricultural by-product material, oily seeds, nut shells, nut meal, fruit pits, vegetable pumice, fruit pumice and combinations thereof. In yet another form of the invention, the combustible non-absorbent material can include a blend comprising at least two agricultural by-product materials.

In another form of the invention, the combustible non-absorbent material can include a filter cake material containing magnesium silicate and one or more residual fuel materials. In another form of the invention, the combustible non-absorbent material can be a blend of at least two component materials, where the first component material can include at least one agricultural by-product material and/or blend of such materials, and the second component material may include a distillers grain and/or a filter cake material. In yet another form of the invention, the combustible non-absorbent material may contain a blend of at least three components, including an agricultural by-product or blend of such materials, a distillers grain, a filter cake material, or combinations thereof.

In another form of the invention, the constituents (a), (b) and (c) respectively can contain, by weight to equal about 100 parts: from about 0% to about 35% combustible cellulosic material; from about 10% to about 75% combustible non-absorbent oil-retaining agricultural residues; and from about 25% to about 55% combustible petroleum wax material or non-petroleum wax material.

In another form of the invention, the combustible non-absorbent material may contain distiller's grain and the constituents can include, by weight to equal about 100 parts: from about 5% to about 40% combustible cellulosic material; from about 15% to about 65% combustible non-absorbent, oil retaining distillers grain; and from about 30% to about 50% combustible petroleum material or non-petroleum wax material.

In another form of the invention, the combustible non-absorbent material can include a filter cake material and the constituents can be, by weight to equal about 100 parts: from about 25% to about 40% combustible cellulosic material; from about 10% to about 25% combustible, non-absorbent oil-retaining filter cake; and from about 35% to about 50% combustible petroleum or non-petroleum wax material.

In another aspect of the invention, a firelog can further contain at least one combustible binding agent (d), where the constituents (a), (b), (c), and (d) respectively can include, by weight to equal about 100 parts: about 0% to about 40% combustible cellulosic material (a); about 10% to about 75% combustible, non-absorbent oil or fat retaining material (b); about 25% to about 45% combustible wax material (c); and about 5% to about 15% combustible binding agent (d). In one form of the invention, the binding agent can be vegetable starch, glycerol, molasses, or combinations thereof.

In another form of the invention, the wax constituent can be a blend of at least two combustible wax materials including petroleum wax material and/or non-petroleum wax material, where one or both materials are present in a range from about 5% to about 60% by weight. In yet another form of the invention, the blend can include two or more petroleum wax materials. In another form of the invention, the blend may include two or more non-petroleum wax materials. In a further form of the invention, the wax constituent can contain a blends having one or more petroleum wax materials one or more non-petroleum wax materials.

In another aspect of the invention, a fuel composition is provided which can contain one or more combustible non-absorbent materials that may include at least one oil-retaining or fat-retaining material such as agricultural by-products, distiller's grains, filter cake materials, or combinations thereof. In one form of the invention, the combustible non-absorbent material may contain one or more agricultural by-product materials, including by-products such as oily seeds, nut shells, nut meal, fruit pits, vegetable pumice, fruit pumice and combinations thereof. In another form of the invention, the non-absorbent material may include a filter cake material containing magnesium silicate and one or more residual fuel materials. In yet another form of the invention, the combustible non-absorbent material may contain distillers grain.

DETAILED DESCRIPTION OF THE INVENTION

Figure 1:
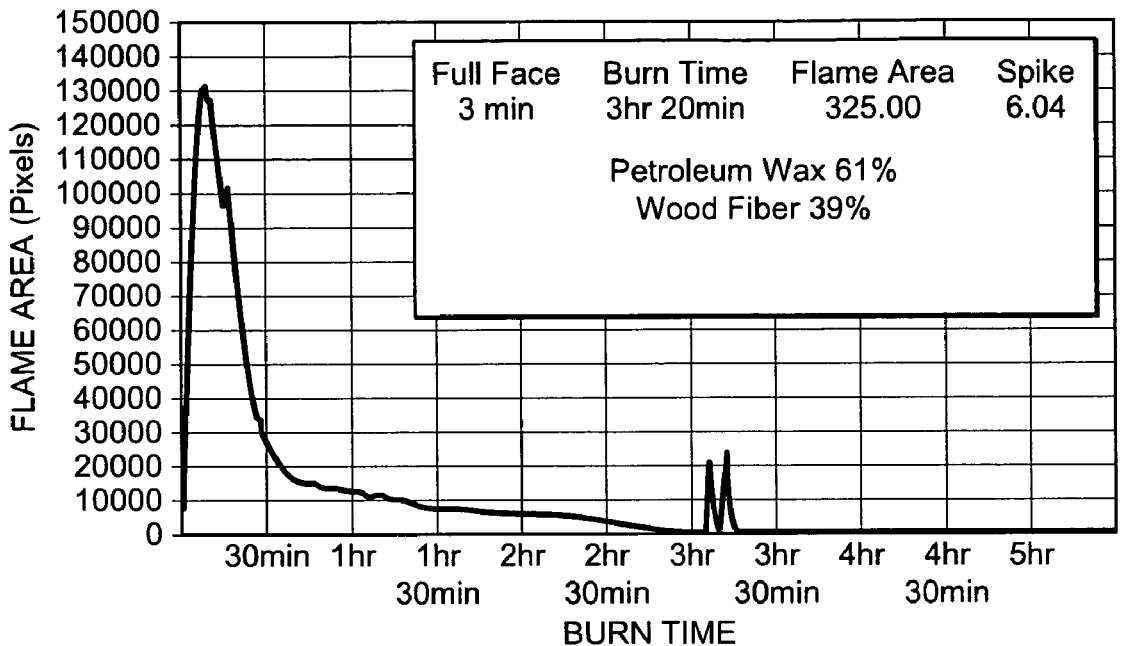
FIG. 1 is a line graph of one embodiment of the invention illustrating the burn time of a firelog having 61% combustible wax and 39% wood fiber comprising wood sawdust.
Figure 2:
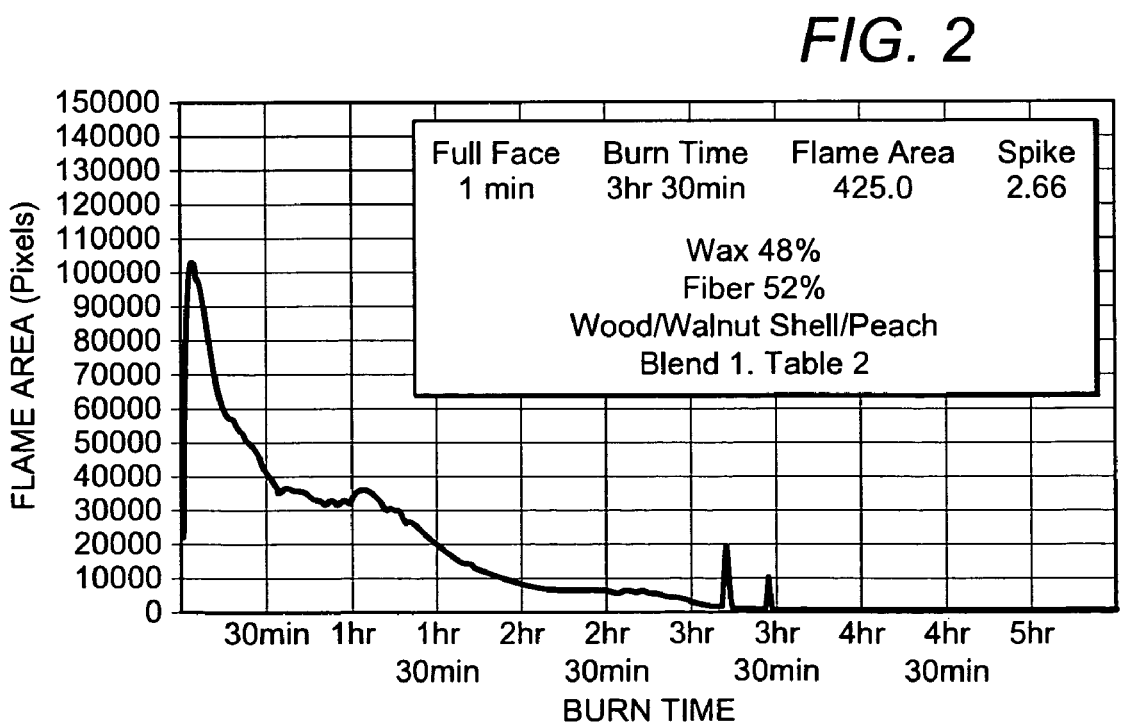
FIG. 2 is a line graph of one embodiment of the invention illustrating the burn time of a firelog having 48% combustible wax and 52% fiber comprising wood sawdust, walnut shell and peach pit.
Figure 3:
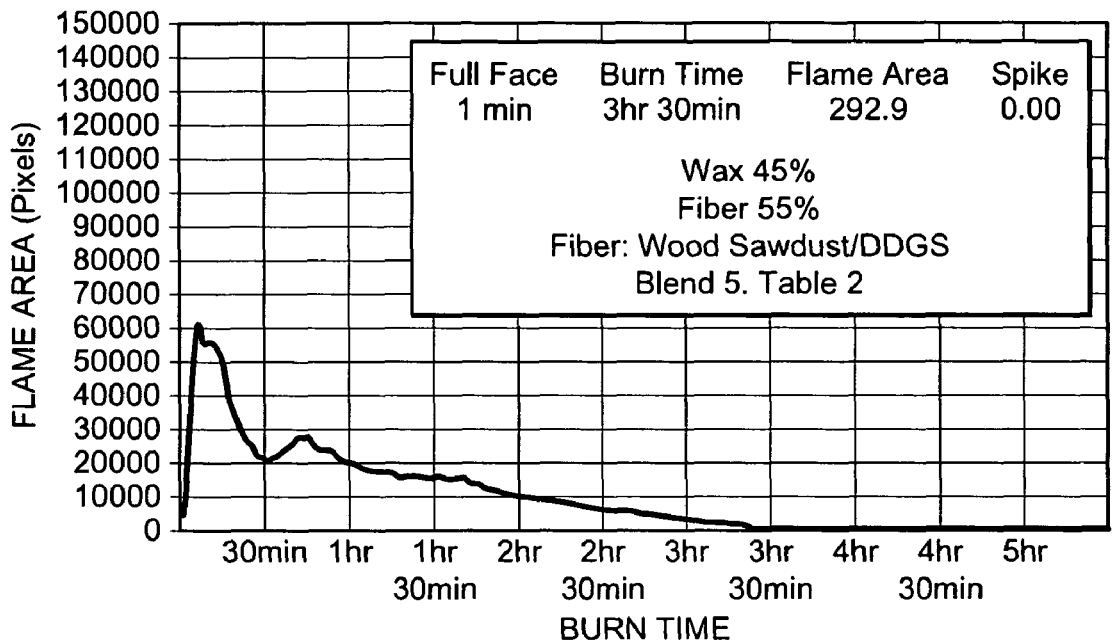
FIG. 3 is a line graph of one embodiment of the invention illustrating the burn time of a firelog having 45% combustible wax and 55% fiber comprising wood sawdust and dried distillers grain with solubles (DDGS)
Figure 4:
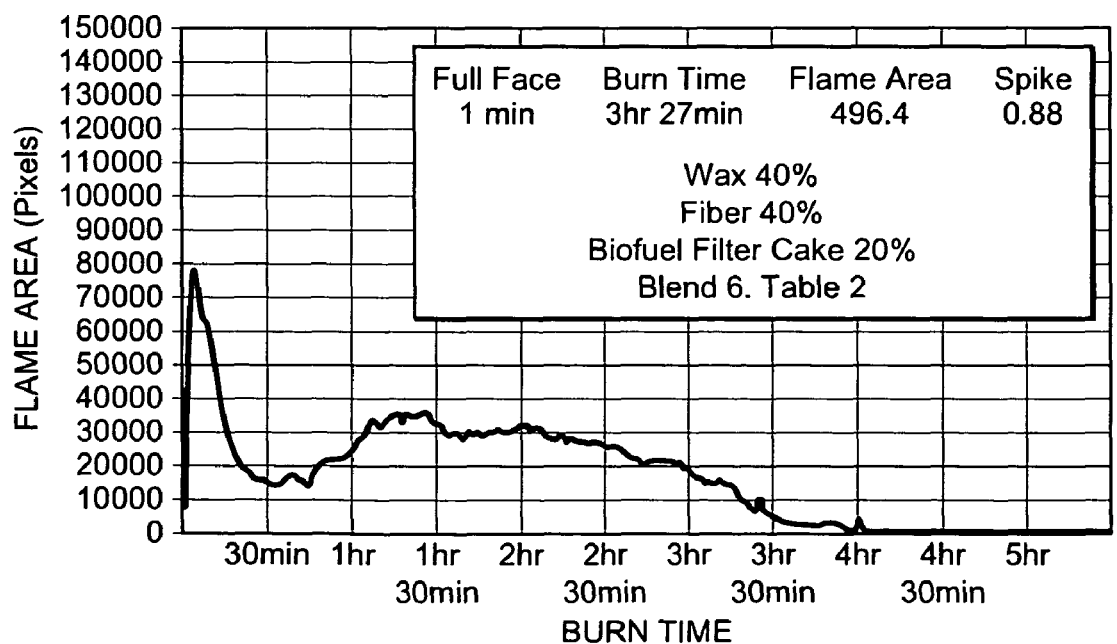
FIG. 4 is a line graph of one embodiment of the invention illustrating the burn time of a firelog having 40% combustible wax, 40% fiber comprising wood sawdust and walnut shell, and 20% biofuel filter cake.

Generally, an artificial firelog incorporating features of the invention may provide fuel reduction benefits by substituting non-woody cellulosic material, either in full or in part, for petroleum wax. The non-absorbent nature of the cellulosic fibers can provide increased BTU value beyond the cellulosic or mineral components of the material itself, thereby providing means to decrease the amount of costly petroleum wax used in a firelog. The constituents of a firelog according to one embodiment of the invention may, for example, include a combustible cellulosic or fiber material, non-absorbent combustible oil- and/or fat-retaining cellulosic or mineral material, and a combustible binder/fuel or wax in appropriate proportions by weight to achieve the objects of the present invention.

Replacing part of the sawdust by a mixture (e.g. blend) of non-woody cellulosic material, one which does not fully or substantially absorb wax can lower the overall wax content of the firelog and improve combustion while still maintaining normal firelog appearance and performance. For example, the use of agricultural by-products such as walnut shell fines, ground olive pits, ground peach pits, grape pumice, walnut meal, or ground prune pits, or a distillers grain, either in part or whole, to replace the wood sawdust allows the manufacturing of a firelog with a substantially less quantity of wax as the binder element. These agricultural by-products (i.e. materials and/or residues), because of their residual oil content, have similar or higher calorific value than wood as shown in Table 1. Therefore, any replacement for wood should not reduce the calorific output of the firelog. Table 1 also shows the oil retention capacity of these materials, which can be five to nine times less oil absorbing than softwood fiber. Correspondingly, if these agricultural by-products are used as cellulosic fiber replacement, less wax may be required to make a firelog that provides an equivalent burn performance.

The BTU/lb, volatile/fixed carbon, and ash (% by weight) contents of several non-petroleum raw materials are listed in Table 1. These values were determined using approximate ultimate analysis. The oil content was determined using ASTM Method D1105. The oil retention/absorption of the material/fiber was measured using an internal procedure that employs the use of a conventional plastic syringe constricted by a filter paper. A measured sample of the fiber was inserted into the syringe and the weight recorded. Mineral oil was then added to saturate the fiber in the syringe. After 1 hour, the syringe is drained of the excess oil and weighed. A vacuum was applied in the syringe at different time intervals and the syringe weights recorded. The oil retention of each fiber treatment sample was calculated by subtracting the initial weight measurement from the final weight measurement. Oil retention results were then adjusted to a uniform oil retention-per-gram-of-fiber basis.

In accordance with one embodiment of the present invention, an artificial firelog may include (a) combustible cellulosic or fiber material; (b) non-absorbent combustible oil- and/or fat-retaining cellulosic or mineral material; and (c) combustible wax, wherein the relative proportions of the constituents are, by weight, from about 0% to about 40% of (a), from about 10% to about 75% of (b), and from about 25% to about 55% of (c), for about 100 parts of (a), (b) and (c). In another embodiment, a combustible binding agent may be added to the blend of materials, allowing for the more costly combustible wax component to be further reduced, in at least some embodiments, by up to about 10% of the weight of the firelog.

Examples of combustible cellulosic or fiber material include, without limitation, wood particles, pulp, shavings or chips, sawdust, ground bark, shredded paper or cardboard, waxed cardboard, charcoal powder, sphagnum moss, and agricultural waste materials such as straw, bagasse, grass clippings, leaves, cotton linter, rice hulls, peanut or other nut shells and hulls, and coffee grounds, and blends of any two or more of the foregoing.

TABLE 1

Characteristics of Agricultural Materials

| Raw Material | BTU/lb | Volatile/ Fixed Carbon | Ash % | Oil Absorption % | Oil Content % |
|---|---|---|---|---|---|
| Walnut Meal | 8779 | 2.7 | 2.81 | 25 | 4.42 |
| Walnut Shell | 8985 | 3.6 | 1.02 | 30 | 4.19 |
| Olive pits | 9538 | 4.5 | 2.01 | 38 | 6.7 |
| Distillers grain | 9460 | 7.1 | 4.27 | 28 | 9.17 |
| Prune pits | 9331 | 4.5 | 1.35 | 20 | 9.63 |
| Peach pits | 9224 | 4.5 | 3.56 | 20 | 3.44 |
| Grape Pumice | 9171 | 3.4 | 6.15 | 27 | 6.45 |
| Sawdust (softwood) | 8629 | 5.1 | .38 | 180 | 0.99 |
| Coffee Grounds | 10559 | 5.2 | 1.71 | 40 | 9.77 |

Examples of suitable non-absorbent oil- and/or fat-retaining materials may, for example, include any material that naturally contains or synthetically retains combustible fats, oils and/or waxes, including without limitation one or more of the following materials either alone or as a blend: plant or agricultural by-product materials including walnut shell and walnut meal, almond shell, rapeseed, prune pits, olive pits and pumice, rice bran, sunflower seeds, soybean, wheat germ, safflower, peanut shell, palm kernel, grape seed and pumice, flax seed, cottonseed, corn, coconut shell and/or distillers grains, which is the cereal by-product of brewers or ethanol distillation processes. Filtering medias used to filter fats, oils and waxes, including without limitation agricultural filter cakes and biodiesel filter cakes of a mineral derived from materials such as diatomaceous earth or magnesium silicate may also be used. Such filter cakes may contain residual fuel materials including without limitation alcohols, glycerins, and fatty acid methyl esters.

Examples of suitable waxes and wax materials include without limitation mixtures of petroleum and/or non-petroleum waxes creating a formulated blend. Non-limiting examples of petroleum waxes include combustible paraffins, microcrystalline and waxy crude oils consisting of any of the following, either in whole or as part of a blend: slack wax, scale wax, brite stock, residual wax, olefins, and resins. Non-limiting examples of non-petroleum waxes include combustible vegetable and/or animal oils, fats and wax materials, consisting of any of the following, in whole or as part of a blend: plant and/or vegetable and/or animal oils, fats, waxy materials including triglycerides, sterols, terpenes, all C12 through C22 fatty acids (for example, lauric, myristic, palmitic, stearic, oleic, linoleic, erucic), fatty alcohols, glycerol, pitch, rosins and other substances and residues from soybean, canola, palm, palm kernel, beef tallow, lard, yellow grease, corn, safflower and pine pulp tall oil. An individual wax component may range from about 5% to about 60% (by weight) of a formulated wax blend.

Non-limiting examples of a combustible binder include a polysaccharide such as vegetable starch or polyols such as molasses or glycerin, and blends of these materials.

Some examples of artificial firelog blends in accordance with the present invention (with percentages by weight) are shown below in Table 2.

Various sources of agricultural by-products and biodiesel filter cake can be utilized in some embodiments as non-absorbing oil materials. One non-limiting example includes wood fiber from softwood or hardwood origin, which can be used in conjunction with a binder material consisting of a natural wax, a petroleum-derived wax, or a combination of both. In some embodiments additives, such as glycerol, or molasses may also be added for binding and flame controlling purposes. The amount of wax can be substantially reduced by the incorporation of non-absorbing oil materials in the formulation. Firelogs with a wax content as low as about 25% by weight, for example, can be produced when select oil-retaining agricultural by-products are used.

Firelogs can also be formulated which include from about 25% to about 55% of wax by weight of firelog, and about 45% to about 75% of fiber by weight of firelog. The fiber matrix can be a combination of cellulosic wood fiber and non-absorbing, oil-retaining materials in some embodiments. The wood fiber content can vary from about 0% to about 40% by weight of the firelog, and the non-absorbing oil and/or fat-retaining material may vary from about 10% to about 75% by weight of the firelog.

In some material combinations, the non-absorbing materials can also be used as a single fiber component of a blend, thereby excluding the cellulosic wood fiber in the mixture. As long as the weight percentages of the various ingredients of the composition are kept within the ranges set forth above, the resulting wax-fiber blend can be used for the production of firelogs with predictable flame output and burning times that are comparable to or better than firelogs with about 10% to about 20% greater added wax content.

FIGS. 1-4 provide a comparison of the flame profiles and burn performance of roughly equal sized firelogs made using different formulations. FIG. 1 represents the performance of a firelog made with a traditional blend of 61% combustible wax and 39% cellulosic wood fiber, whereas FIGS. 2-4 demonstrate the burn performance of various combinations of materials according to several different embodiments of the present invention outlined in Table 2. It is notable that the firelog of FIG. 1 has a very aggressive burn profile for the first 45 minutes of the burn and then produces a steady but modest flame profile through the duration of the overall burn. In contrast, FIGS. 2-4 demonstrate a less aggressive burn profile during the initial burn phase, but improved performance and flame profiles for the duration of the burn cycle in comparison to the firelog of FIG. 1.

This difference in burn performance is directly related to the nature of the combustible wax content of the firelogs and how such wax is bound to the fiber component of the logs. The firelog of FIG. 1 contains highly absorbent wood fiber and therefore allows for greater absorption of excess wax binder. Upon ignition, this excess combustible wax burns off or wicks out of the firelog mixture much more readily, producing a more aggressive burn profile. In contrast, the firelogs of FIGS. 2-4 have less excess combustible wax due to the non-absorbent nature of the constituent oil retaining materials in the firelogs, and therefore there is less excess combustible wax to burn off in the initial burn phase as compared the firelog in FIG. 1.

Furthermore, once the excess combustible wax wicks out or burns off during the first about 45 minutes to about one hour of burning of all the firelogs, the burn performance is dictated by the combustion of the remaining bound wax-fiber matrix of the firelog. The firelog of FIG. 1, for example, contains standard wood fiber with no retained oils or fats and therefore burns less vigorously than the firelogs of FIGS. 2-4 which include oil retaining materials. The oil and/or fat content of such oil retaining materials can provide added fuel content for combustion throughout the duration of the burn. Therefore, the non-absorbent oil and/or fat retaining constituents of the firelog formulations provided by the invention can allow not only for a substantial reduction of more costly added combustible wax constituents in a firelog, but also reduces the overly aggressive initial burn off rate of wax which is common with firelogs made with more absorbent wood fibers. Furthermore, the presence of additional fat and/or oil in the non-absorbent fiber constituents also provides additional fuel for combustion throughout the burning process of the firelog, thereby producing a firelog that performs with more abundant flame production throughout the entire burn duration, and thus a more desirable experience for the user of the product.

TABLE 2

Examples of Non-Absorbing Firelog Formulations

| Material | Blend 1 | Blend 2 | Blend 3 | Blend 4 | Blend 5 | Blend 6 |
| --- | --- | --- | --- | --- | --- | --- |
| Wax | 48% | 48% | 40% | 30% | 45% | 40% |
| Wood Sawdust | 23% | 21% | 5% | 5% | 33% | 28% |
| Walnut Shell | 10% | 10% | 5% | 10% | | 12% |
| Walnut Meal | | 5% | 20% | 10% | | |
| Peach Pit | 19% | 16% | | 15% | | |
| Dried Distillers Grain w/ Solubles | | | 20% | 25% | 22% | |
| Grape Pumice | | | 10% | | | |
| Filter Cake | | | | | 5% | 20% |

Other additives may include chemicals designed to color or otherwise modify or retard the flame, add aroma or change the burning characteristics of the artificial firelog to more closely mimic the burning of natural firelogs, as well as various kinds of natural seeds and/or particulate industrial byproducts, such as metallurgical coke, for simulating the crackling sounds produced by a burning natural firelog. A broad range of known firelog cross sectional shapes may also be employed. For example, one or more longitudinally extending grooves may be provided to accelerate ignition. Still further, as is well known, the artificial firelogs may be enveloped in outer wrappers for protecting the firelog and facilitating its ignition. Artificial firelogs in accordance with the present invention may make use of the materials, configurations and other attributes summarized above; the foregoing list is not intended to limit the composition, configuration, or other attributes of flammable artificial firelogs described and claimed herein.

Preparation of the materials and fabrication of artificial firelogs pursuant to the present invention can be consistent with conventional firelog manufacturing practices. For example, the oil-retaining medium material preferably has a moisture content of about 8% to about 10%. This material can be ground to a consistent particle size that will pass through, for example, a 3/16±1/16 inch mesh screen. The ground material can then be mixed with similar particle size cellulosic fiber material. The moisture content for the cellulosic material should preferably be below about 14%. The combined blend of oil-retaining material with cellulosic fiber may then be admixed with hot (e.g. liquid or molten) wax. The mixture of the three materials can then be cooled either naturally or mechanically. Once the mixture has cooled below about 95° F. it may then be formed into firelog shape using conventional firelog industry techniques, typically by extrusion, molding or compression.

The inclusion of the low cost, non-absorbent combustible oil- and/or fat-retaining material allows the combustible wax constituent to be reduced by, for example, about 10% to about 30% (by weight) compared to conventional firelog formulations comprising cellulosic and petroleum wax constituents, thereby allowing significant cost savings without appreciably reducing the fuel content of the final product.

While illustrative embodiments of the invention have been described, numerous variations and alternate embodiments will occur to those skilled in the art. Such variations and alternate embodiments are contemplated, and can be made without departing from the spirit and scope of the invention as defined by the appended claims.

We claim:

1. An artificial firelog comprising as constituents (a) at least one combustible cellulosic material; (b) at least one combustible non-absorbent material selected from the group consisting of ground oil-retaining and fat-retaining material, said group not including coffee grounds; and (c) at least one combustible wax material, wherein the relative proportions of the constituents are, by weight, from about 0% to about 40% of (a), from about 10% to about 75% of (b), and from about 25% to about 55% of (c), for about 100 parts of (a), (b) and (c).

2. The firelog of claim 1, wherein the at least one combustible non-absorbent material (b) comprises at least one of an agricultural by-product, a distillers grain, a filter cake material, and combinations thereof.

3. The firelog of claim 2, wherein the at least one combustible non-absorbent material (b) comprises an agricultural by-product material selected from the group consisting of oily seeds, nut shells, nut meal, fruit pits, vegetable pumice, fruit pumice and combinations thereof.

4. The firelog of claim 3, wherein the constituents (a), (b) and (c) respectively comprise, by weight to equal about 100 parts comprising:
   (a) from about 0% to about 35% combustible cellulosic material;
   (b) from about 10% to about 75% combustible nonabsorbent oil-retaining agricultural residues; and
   from about 25% to about 55% combustible petroleum wax material or non-petroleum wax material.

5. The firelog of claim 3, wherein the at least one combustible non-absorbent material (b) comprises a blend comprising at least two agricultural by-product materials.

6. The firelog of claim 5, wherein the constituents (a), (b) and (c) respectively comprise, by weight to equal about 100 parts comprising:
   (a) from about 0% to about 35% combustible cellulosic material;
   (b) from about 10% to about 75% combustible nonabsorbent oil-retaining agricultural residues; and
   from about 25% to about 55% combustible petroleum or non-petroleum wax material.

7. An artificial firelog comprising as constituents (a) at least one combustible cellulosic material; (b) at least one combustible non-absorbent material comprising at least one of a ground agricultural by-product, a distillers grain, a magnesium silicate filter cake material containing at least one residual fuel element, and combinations thereof; and (c) at least one combustible wax material, wherein the relative proportions of the constituents are, by weight, from about 0% to about 40% of (a), from about 10% to about 75% of (b), and from about 25% to about 55% of (c), for about 100 parts of (a), (b) and (c) where said fire log does not contain coffee grounds.

8. An artificial firelog comprising as constituents (a) at least one combustible cellulosic material; (b) a blend comprising at least two component materials, wherein the first component material comprises agricultural by-product material or a blend comprising agricultural by-product materials, and the second component material comprises at least one of a distillers grain and a filter cake material; and (c) at least one combustible wax material, wherein the relative proportions of the constituents are, by weight, from about 0% to about 40% of (a), from about 10% to about 75% of (b), and from about 25% to about 55% of (c), for about 100 parts of (a), (b) and (c).

9. The firelog of claim 8, wherein (b) comprises a blend comprising at least three component materials selected from the group consisting of an agricultural by-product material, a blend comprising agricultural by-product materials, a distillers grain, a filter cake material, and combinations thereof.

10. The firelog of claim 2, wherein the combustible non-absorbent material (b) comprises at least one distiller's grain and the constituents (a), (b) and (c) respectively comprise, by weight to equal about 100 parts comprising:
    (a) from about 5% to about 40% combustible cellulosic material;
    (b) from about 15% to about 65% combustible nonabsorbent, oil retaining distillers grain; and
    (c) from about 30% to about 50% combustible petroleum material or non-petroleum wax material.

11. The firelog of claim 7, wherein the combustible non-absorbent material (b) comprises a filter cake material and the constituents (a), (b) and (c) respectively comprise by weight to equal about 100 parts comprising:
    (a) from about 25% to about 40% combustible cellulosic material;
    (b) from about 10% to about 25% combustible, nonabsorbent oil-retaining filter cake; and
    (c) from about 35% to about 50% combustible petroleum or non-petroleum wax material.

12. The firelog of claim 1, further comprising at least one combustible binding agent (d), wherein the constituents (a), (b), (c), and (d) respectively comprise by weight to equal about 100 parts comprising:
    (a) about 0% to about 40% combustible cellulosic material;
    (b) about 10% to about 75% combustible, nonabsorbent oil or fat retaining material;
    (c) about 25% to about 45% combustible wax material; and
    (d) about 5% to about 15% combustible binding agent.

13. The firelog of claim 12, wherein the at least one combustible binding agent (d) is selected from the group consisting of vegetable starch, glycerol, molasses, and combinations thereof.

14. The firelog of claim 1, wherein the combustible wax constituent (c) comprises a blend comprising at least two combustible wax materials, wherein:
    the at least two wax materials comprise at least one of a petroleum wax material and a non-petroleum wax material; and
    an amount of at least one of the at least two wax materials ranges from about 5% to about 60% by weight.

15. The firelog of claim 14, wherein the at least two wax materials comprise at least two petroleum wax materials.

16. The firelog of claim 14, wherein the at least two wax materials comprise at least two non-petroleum wax materials.

17. The firelog of claim 14 wherein the at least two wax materials comprise at least one petroleum wax material and at least one non-petroleum wax material.

* * * * *

(12) EX PARTE REEXAMINATION CERTIFICATE (10521st)
United States Patent
Cavero, Jr. et al.

(10) Number: US 8,123,824 C1
(45) Certificate Issued: Mar. 5, 2015

(54) ARTIFICIAL FIRELOG USING OIL AND/OR FAT-RETAINING MATERIALS

(75) Inventors: Alexander U. Cavero, Jr., Stockton, CA (US); Gary W. Leach, Escalon, CA (US); Willer de Oliveira, Stockton, CA (US); Alan Zachary, Oakdale, CA (US)

(73) Assignee: Duraflame, Inc., Stockton, CA (US)

Reexamination Request:
No. 90/012,441, Aug. 17, 2012

Reexamination Certificate for:
Patent No.: 8,123,824
Issued: Feb. 28, 2012
Appl. No.: 12/004,252
Filed: Dec. 18, 2007

Related U.S. Application Data

(60) Provisional application No. 60/875,983, filed on Dec. 19, 2006.

(51) Int. Cl.
*C10L 11/00* (2006.01)
*C10L 5/36* (2006.01)
*C10L 5/44* (2006.01)
*C10L 7/00* (2006.01)

(52) U.S. Cl.
CPC . *C10L 5/361* (2013.01); *C10L 5/44* (2013.01); *C10L 7/00* (2013.01); *C10L 5/365* (2013.01); *Y02E 50/30* (2013.01); *Y02E 50/10* (2013.01)
USPC .................... 44/535; 44/550; 44/589; 44/590

(58) Field of Classification Search
None
See application file for complete search history.

(56) References Cited

To view the complete listing of prior art documents cited during the proceeding for Reexamination Control Number 90/012,441, please refer to the USPTO's public Patent Application Information Retrieval (PAIR) system under the Display References tab.

*Primary Examiner* — Jerry D Johnson

(57) ABSTRACT

An artificial firelog according to the present invention may comprise as constituents a combustible cellulosic or fiber material, a non-absorbent combustible oil- and/or fat-retaining material, and a combustible binder/fuel or wax in appropriate proportions. A combustible binding agent may be also be added as an additional constituent material to allow a further reduction of the combustible wax component. Certain naturally occurring agricultural by products and synthetic filter materials contain oils and/or fats that provide increased BTU value beyond the cellulosic or mineral components of the material. When these oil- and/or fat-retaining materials added to a blend of firelog material, the non-absorbent properties and additional BTU content of these alternative raw materials allow the amount of higher BTU wax material to be reduced without a dramatic reduction in fuel content in the finished mixture. The non-absorbent oil- and/or fat-retaining materials are significantly less expensive per mass than petroleum wax, and substituting these materials for more costly types of wax reduces cost without degrading the performance of the final firelog product.

At the time of issuance and publication of this certificate, the patent remains subject to pending reissue application number 14/035,759 filed Sep. 24, 2013. The claim content of the patent may be subsequently revised if a reissue patent is issued from the reissue application.

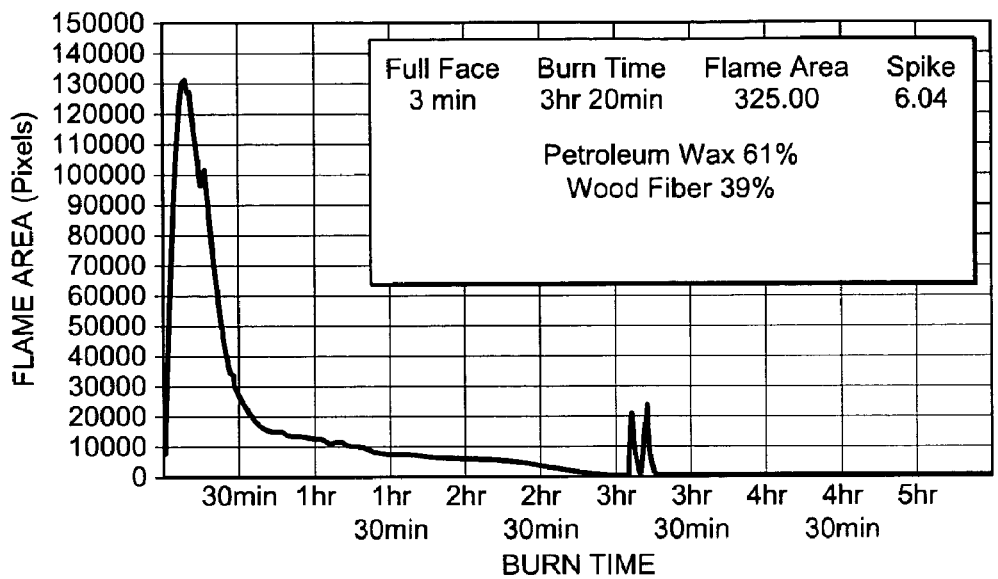

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

\* \* \* \* \*